United States Patent
Tanaka et al.

(10) Patent No.: US 10,859,175 B2
(45) Date of Patent: Dec. 8, 2020

(54) FLOW CONTROL VALVE APPARATUS

(71) Applicant: KAWASAKI JUKOGYO KABUSHIKI KAISHA, Kobe (JP)

(72) Inventors: Hideki Tanaka, Nishinomiya (JP); Akihiro Kondo, Nishinomiya (JP); Shinya Sasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/308,515

(22) PCT Filed: May 18, 2017

(86) PCT No.: PCT/JP2017/018704
§ 371 (c)(1),
(2) Date: Dec. 10, 2018

(87) PCT Pub. No.: WO2017/212892
PCT Pub. Date: Dec. 14, 2017

(65) Prior Publication Data
US 2019/0162324 A1   May 30, 2019

(30) Foreign Application Priority Data
Jun. 10, 2016 (JP) ................. 2016-116296

(51) Int. Cl.
| F15B 15/18 | (2006.01) |
| F16K 27/00 | (2006.01) |
| F16K 11/22 | (2006.01) |
| F16K 11/24 | (2006.01) |
| F16K 27/02 | (2006.01) |

(Continued)

(52) U.S. Cl.
CPC ............ *F16K 27/003* (2013.01); *F16K 11/22* (2013.01); *F16K 11/24* (2013.01);
(Continued)

(58) Field of Classification Search
CPC .... F16K 27/003; F16K 27/0263; F16K 11/22; F16K 11/24; F16K 31/12; F16K 37/005
(Continued)

(56) References Cited

U.S. PATENT DOCUMENTS 3,060,969 A * 10/1962 Aslan .................... F16K 31/426
137/625.63
4,565,219 A *  1/1986 Kunogi ............... F15B 13/0402
137/624.18
(Continued)

FOREIGN PATENT DOCUMENTS

| JP | H06-129567 A | 5/1994 |
| JP | H07-55031 A | 3/1995 |

(Continued)

*Primary Examiner* — Minh Q Le
(74) *Attorney, Agent, or Firm* — Oliff PLC

(57) ABSTRACT

A flow control valve apparatus includes: a housing including two pump ports, two tank ports, a first supply/discharge port, a second supply/discharge port, and a spool hole; a first spool configured to switch a connection status among one of the pump ports, one of the tank ports, and the first supply/discharge port depending on a position of the first spool; a first actuator configured to move the first spool to each of a first supply position and a first discharge position; a second spool configured to switch a connection status among the other pump port, the other tank port, and the second supply/discharge port depending on a position of the second spool; and a second actuator configured to move the second spool to each of a second supply position and a second discharge position. The first spool and second spool are inserted in the spool hole so as to reciprocate.

10 Claims, 8 Drawing Sheets

(51) Int. Cl.
*F16K 31/12* (2006.01)
*F16K 37/00* (2006.01)

(52) U.S. Cl.
CPC .......... *F16K 27/0263* (2013.01); *F16K 31/12* (2013.01); *F16K 37/005* (2013.01)

(58) Field of Classification Search
USPC .................. 137/596.16, 625.28; 251/129.15; 91/433, 454, 418; 60/427, 445
See application file for complete search history.

(56) References Cited

U.S. PATENT DOCUMENTS

| | | | | |
|---|---|---|---|---|
| 4,763,691 | A | * | 8/1988 | Hahnnann .......... F15B 13/0402 137/596.14 |
| 4,860,792 | A | * | 8/1989 | Ichihashi ............ F15B 13/0402 137/596.17 |
| 4,903,727 | A | * | 2/1990 | Motzer ................ F15B 20/001 137/596.16 |
| 5,385,171 | A | | 1/1995 | Cleasby |
| 5,692,427 | A | | 12/1997 | Yoshida et al. |
| 6,561,221 | B1 | * | 5/2003 | Kurz .................. F15B 13/0402 137/596.17 |
| 9,903,396 | B2 | * | 2/2018 | Brinkman .......... F15B 13/0832 |
| 2017/0292541 | A1 | * | 10/2017 | Miyazoe ............. F16K 31/383 |

FOREIGN PATENT DOCUMENTS

| | | |
|---|---|---|
| JP | H10-141305 A | 5/1998 |
| JP | 2013-249900 A | 12/2013 |
| JP | 2016-053410 A | 4/2016 |
| WO | 2016/035495 A1 | 3/2016 |

\* cited by examiner

FLOW CONTROL VALVE APPARATUS

TECHNICAL FIELD

The present invention relates to a flow control valve apparatus configured to control a flow rate of a pressure liquid.

BACKGROUND ART

A hydraulic cylinder included in industrial equipment, such as an excavator, is configured to operate at a speed corresponding to a supply flow rate or a discharge flow rate, and the hydraulic cylinder is provided with a flow control valve configured to control the supply flow rate and the discharge flow rate. Known as examples of the flow control valve are hydraulic control apparatuses disclosed in PTL 1 and PTL 2.

The hydraulic control apparatus of PTL 1 includes a spool, and electromagnetic solenoids are provided at respective end portions of the spool. Each electromagnetic solenoid can push the corresponding end portion of the spool to move the spool, i.e., change the position of the spool. By changing the position of the spool, the spool switches a connection status among a pump port, a tank port, and two supply/discharge ports. A head-side port and rod-side port of the hydraulic cylinder are connected to the respective supply/discharge ports. To be specific, by switching the connection status among the pump port, the tank port, and the two supply/discharge ports, operating oil can be supplied to or discharged from the hydraulic cylinder, and with this, the hydraulic cylinder can operate. Further, according to the hydraulic control apparatus, an opening degree between the ports can be changed depending on the position of the spool. Thus, the hydraulic control apparatus can control the flow rates of the operating oil supplied to and discharged from each supply/discharge port. As above, meter-in control and meter-out control with respect to the hydraulic cylinder are executed.

PTL 2 discloses that the hydraulic control apparatus includes: a directional control valve coupled to a bottom-side oil chamber of an arm cylinder; and a directional control valve coupled to a piston rod-side oil chamber of the arm cylinder. These two directional control valves can independently control the meter-in and the meter-out.

CITATION LIST

Patent Literature

PTL 1: Japanese Laid-Open Patent Application Publication No. 10-141305
PTL 2: Japanese Laid-Open Patent Application Publication No. 2013-249900

SUMMARY OF INVENTION

Technical Problem

According to a hydraulic excavator, during excavating work, carrying work, or the like, a load acting on the hydraulic cylinder changes from moment to moment depending on postures and moving directions of a boom, an arm, and the like. According to the hydraulic control apparatus of PTL 1, the opening degrees of the two supply/discharge ports are adjusted by one spool. Therefore, the flow rates of the operating oil supplied to and discharged from the hydraulic cylinder depending on the position of the spool are equal to each other. On this account, both when the boom is operated in a direction of gravitational force and when the boom is operated in an opposite direction, the supply flow rate of the operating oil and the discharge flow rate of the operating oil are equal to each other, and therefore, an operating speed of the hydraulic cylinder changes depending on a change in the load. Therefore, an operating lever or the like needs to be manipulated depending on the postures and moving directions of the boom, the arm, and the like. Thus, reproducibility and responsiveness are poor, and such manipulation requires skill. To avoid this, it is preferable that an operation amount of the hydraulic cylinder with respect to a manipulation amount be constant.

One example for realizing this is that as described in PTL 2, the supply and discharge flow rates for the head-side port and the supply and discharge flow rates for the rod-side port are controlled independently. For example, separate flow control valves may be connected to the head-side port and rod-side port of the hydraulic cylinder. With this, the meter-in control and the meter-out control with respect to each of the head-side port and the rod-side port can be executed independently.

The flow control valve is configured by inserting the spool into a valve block including a plurality of spool holes. Therefore, when the flow control valve for the head-side port and the flow control valve for the rod-side port are separately provided, two spool holes are occupied. The excavator includes at least three hydraulic cylinders that are a boom cylinder, an arm cylinder, and a bucket cylinder. When two flow control valves are used for each of the three hydraulic cylinders, the valve block increases in size.

An object of the present invention is to provide a flow control valve apparatus capable of independently controlling supply and discharge flow rates for respective supply/discharge ports and suppressing an increase in size of a housing.

Solution to Problem

A flow control valve apparatus according to the present invention includes: a housing including two pump ports, two tank ports, a first supply/discharge port, a second supply/discharge port, and a spool hole; a first spool configured to switch a connection status among the first pump port, the first tank port, and the first supply/discharge port depending on a position of the first spool; a first actuator configured to move the first spool to each of a first supply position where the first pump port and the first supply/discharge port are connected to each other and a first discharge position where the first tank port and the first supply/discharge port are connected to each other; a second spool configured to switch a connection status among the second pump port, the second tank port, and the second supply/discharge port depending on a position of the second spool; and a second actuator configured to move the second spool to each of a second supply position where the second pump port and the second supply/discharge port are connected to each other and a second discharge position where the second tank port and the second supply/discharge port are connected to each other, wherein the first spool and the second spool are inserted in the spool hole so as to reciprocate.

According to the present invention, the first spool capable of switching the connection status of the first supply/discharge port can be moved by the first actuator, and the second spool capable of switching the connection status of the second supply/discharge port can be moved by the second actuator. As above, since the two spools can be independently moved by the different actuators, the connection status of the first supply/discharge port and the connection status of the second supply/discharge port can be controlled independently.

Further, in the present invention, two spools are inserted in one spool hole. Therefore, the number of spool holes used in the housing can be suppressed to a minimum, and the increase in size of the housing can be suppressed.

In the above invention, the two pump ports, the two tank ports, the first supply/discharge port, and the second supply/discharge port may be arranged such that: when the first spool and the second spool move to a first side in a predetermined direction, the first spool is located at the first supply position, and the second spool is located at the second discharge position; and when the first spool and the second spool move to a second side in the predetermined direction, the first spool is located at the first discharge position, and the second spool is located at the second supply position.

According to the above configuration, when the two spools are moved to the first side in the predetermined direction, the two spools are moved to the first discharge position and the second supply position, respectively. Further, when the two spools are moved to the second side in the predetermined direction, the two spools are moved to the first supply position and the second discharge position, respectively. Therefore, even when two spools are inserted in and arranged in one spool hole, the spools can be moved without interfering with each other. With this, as compared to a case where two spool move in different directions, the length of the spool hole can be made short, and the increase in size of the block can be suppressed.

In the above invention, the first and second spools may be arranged close to each other in the spool hole.

According to the above configuration, since the two spools are arranged close to each other, one of the spools can push the other spool. With this, even when the second actuator malfunctions, the second spool is pushed by moving the first spool to the supply position. Thus, the second spool can be moved to the discharge position. Therefore, the operating oil can be prevented from being excessively supplied by moving only the first spool to the supply position.

According to the present invention, two spools are arranged close to each other. Therefore, when the second spool cannot move, the first spool contacts the second spool, and this restricts the movement of the first spool. To be specific, since the second spool serves as a stopper, the operating oil can be prevented from being excessively supplied by moving only the first spool to the supply position.

In the above invention, the flow control valve apparatus may be configured such that: the first actuator pushes and pulls the first spool to make the first spool reciprocate; the second actuator pushes and pulls the second spool to make the second spool reciprocate; the first actuator is arranged at the first side of the housing in the predetermined direction; and the second actuator is arranged at the second side of the housing in the predetermined direction.

According to the above configuration, an actuator is arranged at the first side of the first spool in the predetermined direction, and another actuator is arranged at the second side of the second spool in the predetermined direction. Therefore, as compared to a case where driving portions are arranged at both sides of each of the spools in the predetermined direction, the flow control valve apparatus can be reduced in size.

In the above invention, the flow control valve apparatus may further include: a first biasing mechanism configured to bias the first spool against pushing and pulling by the first actuator; and a second biasing mechanism configured to bias the second spool against pushing and pulling by the second actuator, wherein: when the first spool is located at a first neutral position, the first spool may block the first pump port, the first tank port, and the first supply/discharge port; when the second spool is located at a second neutral position, the second spool may block the second pump port, the second tank port, and the second supply/discharge port; the first biasing mechanism may bias the first spool toward the first neutral position; and the second biasing mechanism may bias the second spool toward the second neutral position.

According to the above configuration, the spools are biased toward the corresponding neutral positions by the corresponding biasing mechanisms. Therefore, even if the two actuators malfunction, the pressure oil can be prevented from being continuously and excessively supplied. Thus, fail safe can be achieved.

In the above invention, the first actuator and the second actuator may be linear motion electric actuators.

According to the above configuration, the positions of the two spools can be adjusted with a high degree of accuracy. With this, the operating oil can be accurately supplied or discharged at the flow rate corresponding to the current.

Advantageous Effects of Invention

According to the present invention, the supply flow rate and the discharge flow rate with respect to each supply/discharge port can be controlled independently, and the increase in size of the housing can be suppressed.

The above object, other objects, features, and advantages of the present invention will be made clear by the following detailed explanation of preferred embodiments with reference to the attached drawings.

DESCRIPTION OF EMBODIMENTS

Hereinafter, a flow control valve apparatus 1 according to an embodiment of the present invention will be explained with reference to the drawings. It should be noted that directions stated in the following explanations are used for convenience of explanation, and directions and the like of components of the present invention are not limited. Further, the flow control valve apparatus 1 explained below is just one embodiment of the present invention. Therefore, the present invention is not limited to the embodiments, and additions, deletions, and modifications may be made within the scope of the present invention.

Figure 1:
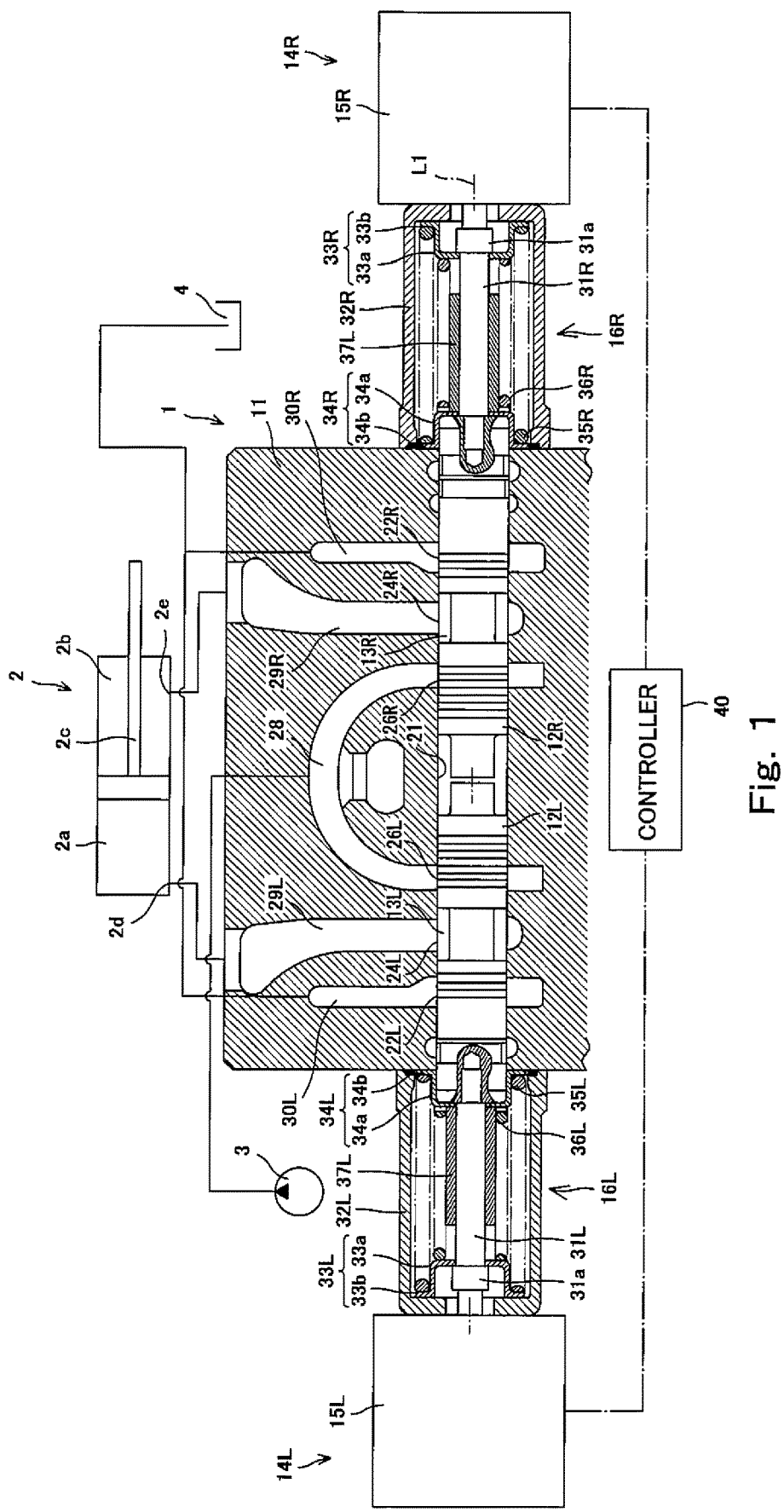
FIG. 1 is a sectional view showing a flow control valve apparatus according to the present invention.

An industrial machinery, such as a hydraulic excavator, includes a plurality of hydraulic cylinders 2 shown in FIG. 1. By supplying operating oil to the hydraulic cylinders 2 and discharging the operating oil from the hydraulic cylinders 2, constituting members, such as a boom, an arm, and a bucket, are moved. Each of the hydraulic cylinders 2 is, for example, a double-acting hydraulic cylinder and includes a head-side oil chamber 2a and a rod-side oil chamber 2b. According to the hydraulic cylinder 2, the operating oil can be supplied to and discharged from the oil chamber 2a through a head-side port 2d, and the operating oil can be supplied to and discharged from the oil chamber 2b through a rod-side port 2e. By the supply and discharge of the operating oil, a rod 2c reciprocates to move the constituting members.

A hydraulic pump 3 and a tank 4 are connected to the hydraulic cylinder 2 through the flow control valve apparatus 1. The flow control valve apparatus 1 supplies the operating oil from the hydraulic pump 3 to the hydraulic cylinder 2 and controls a supply flow rate of the operating oil. Further, the flow control valve apparatus 1 discharges the operating oil from the hydraulic cylinder 2 to the tank 4 and controls a discharge flow rate of the operating oil. As above, meter-in control and meter-out control with respect to the hydraulic cylinder 2 are executed by the flow control valve apparatus 1. The following will explain the configuration of the flow control valve apparatus 1.

Configuration of Flow Control Valve Apparatus

The flow control valve apparatus 1 includes a block 11, two spools 12L and 12R, two actuators 14L and 14R, and two biasing mechanisms 16L and 16R. The block 11 that is one example of a housing is, for example, a valve block and includes at least one spool hole 21. The spool hole 21 extends along a predetermined axis L1. The block 11 further includes two tank ports 22L and 22R, two supply/discharge ports 24L and 24R, and two pump ports 26L and 26R. These six ports 22L, 22R, 24L, 24R, 26L, and 26R are open at the spool hole 21.

More specifically, the two tank ports 22L and 22R are arranged away from each other at both sides of the block 11 in an axial direction, and the two supply/discharge ports 24L and 24R are arranged between the two tank ports 22L and 22R. The pump ports 26L and 26R are arranged between the two supply/discharge ports 24L and 24R and are connected to the hydraulic pump 3 through a pump passage 28. A first supply/discharge port 24L that is the supply/discharge port 24L located at a first side in the axial direction is connected to the head-side port 2d of the hydraulic cylinder 2 through a first oil passage 29L. A second supply/discharge port 24R that is the supply/discharge port 24R located at a second side in the axial direction is connected to the rod-side port 2e of the hydraulic cylinder 2 through a second oil passage 29R. The tank port 22L is connected to the tank 4 through a tank passage 30L, and the tank port 22R is connected to the tank 4 through a tank passage 30R. These six ports 22L, 22R, 24L, 24R, 26L, and 26R are arranged at intervals in the axial direction. In order to switch a connection status among the six ports 22L, 22R, 24L, 24R, 26L, and 26R arranged as above, the two spools 12L and 12R are inserted in the single spool hole 21.

Figure 2:
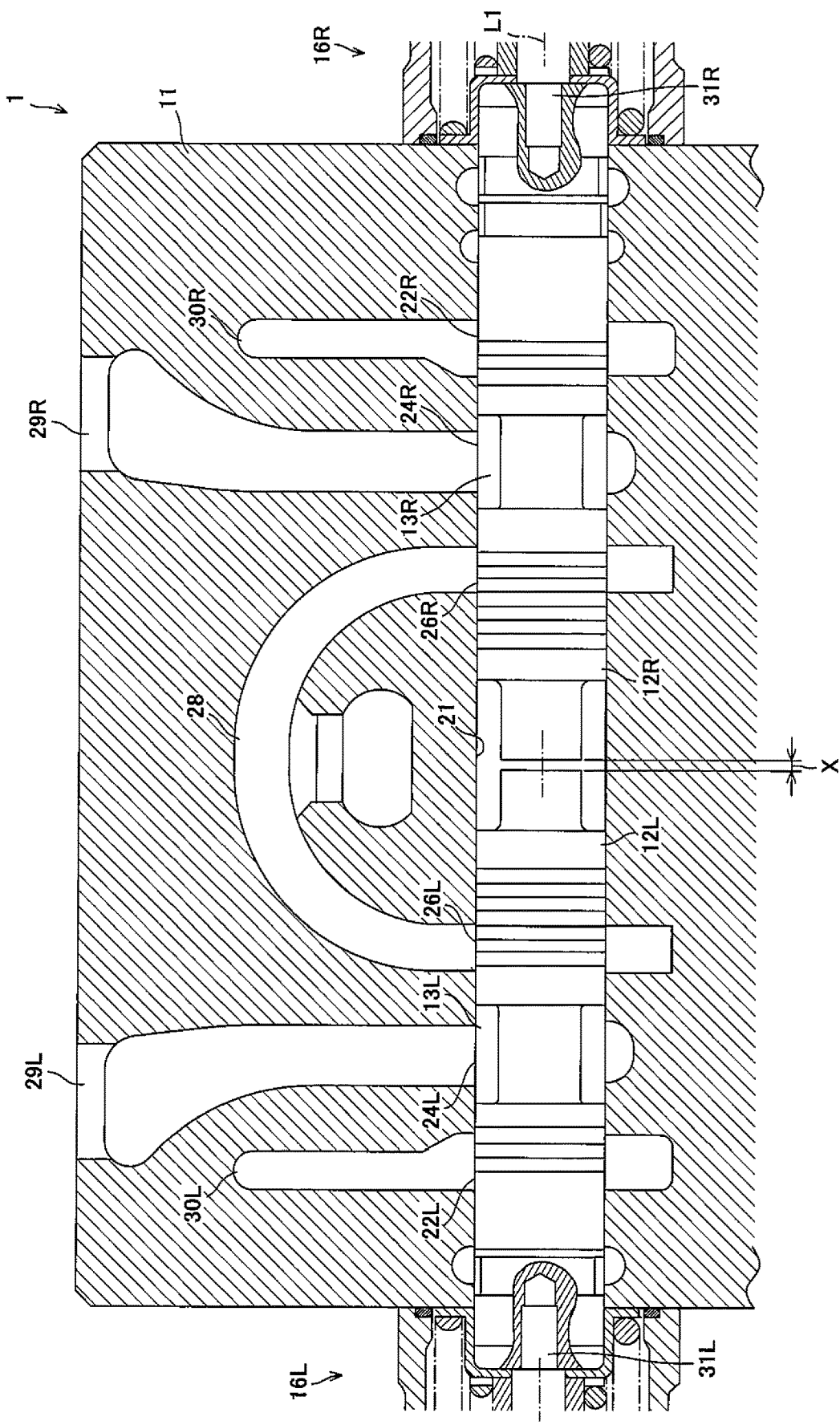
FIG. 2 is an enlarged sectional view showing first and second spools of the flow control valve apparatus of FIG. 1.

The first spool 12L is formed in a substantially columnar shape as shown in FIG. 2 and inserted into the spool hole 21 so as to be able to reciprocate in the axial direction. The first spool 12L is arranged at the first side of the spool hole 21 in the axial direction and changes its position to switch the connection status among the three ports 22L, 24L, and 26L arranged at the first side in the axial direction. More specifically, a round 13L is formed at an intermediate portion of the first spool 12L over the entire periphery in a circumferential direction. The connection status can be switched by changing the position of the round 13L. For example, when the first spool 12L is located at a first neutral position, the round 13L is connected only to the first supply/discharge port 24L, and the remaining two ports 22L and 26L are closed by an outer peripheral surface of the first spool 12L. With this, the three ports 22L, 24L, and 26L are blocked.

When the first spool 12L is moved to the first side in the axial direction to be located at a first discharge position, a part of the round 13L which is located at the first side in the axial direction opens at the first tank port 22L, and with this, the first tank port 22L and the first supply/discharge port 24L are connected to each other through the round 13L. Further, by moving the first spool 12L, an opening degree between the first tank port 22L and the first supply/discharge port 24L can be adjusted. When the first spool 12L is moved to the second side in the axial direction to be located at a first supply position, a part of the round 13L which is located at the second side in the axial direction opens at the first pump port 26L, and with this, the first pump port 26L and the first supply/discharge port 24L are connected to each other through the round 13L. Further, by moving the first spool 12L, the opening degree between the first pump port 26L and the first supply/discharge port 24L can be adjusted.

The second spool 12R is configured in the same manner as the first spool 12L. The second spool 12R is formed in a substantially columnar shape and inserted into the spool hole 21 so as to be able to reciprocate in the axial direction. The second spool 12R is arranged at the second side of the spool hole 21 in the axial direction and changes its position to switch the connection status among the three ports 22R, 24R, and 26R arranged at the second side in the axial direction. More specifically, a round 13R is formed at an intermediate portion of the second spool 12R over the entire periphery in the circumferential direction. The connection status can be switched by changing the position of the round 13R. When the second spool 12R is located at a second neutral position, the round 13R is connected only to the second supply/discharge port 24R, and the remaining two ports 22R and 26R are closed by an outer peripheral surface of the second spool 12R. With this, the three ports 22R, 24R, and 26R are blocked.

When the second spool 12R is moved to the second side in the axial direction to be located at a second discharge position, a part of the round 13R which is located at the second side in the axial direction opens at the second tank port 22R, and with this, the second tank port 22R and the second supply/discharge port 24R are connected to each other through the round 13R. Further, by moving the second spool 12R, the opening degree between the second tank port 22R and the second supply/discharge port 24R can be adjusted. When the second spool 12R is moved to the first side in the axial direction to be located at a second supply position, a part of the round 13R which is located at the first side in the axial direction opens at the second pump port 26R, and with this, the second pump port 26R and the second supply/discharge port 24R are connected to each other through the round 13R. Further, by moving the second spool 12R, the opening degree between the second pump port 26R and the second supply/discharge port 24R can be adjusted.

The two spools 12L and 12R configured as above are arranged close to each other in the axial direction such that tip end portions thereof face each other. In the present embodiment, the two spools 12L and 12R are arranged close to each other such that an interval X is formed between the tip end portions thereof. The interval X is set to about 10% of a maximum stroke length of each of the spools 12L and 12R. It should be noted that the interval X between the two spools 12L and 12R is not limited to the above value. It is preferable that in consideration of a ratio (in the present embodiment, about 2%) of a minimum stroke length necessary for each spool to move from the neutral position to each of the supply position and the discharge position to the maximum stroke length, the interval X be set within, for example, a range of 5% or more and 40% or less of the maximum stroke length of each of the two spools 12L and 12R. It should be noted that the term "close" denotes not only a case where the two spools 12L and 12R are arranged with the interval X but also a case where the two spools 12L and 12R are arranged such that end portions thereof contact each other. As shown in FIG. 1, the first and second actuators 14L and 14R are provided at respective base end portions of the two spools 12L and 12R arranged close to each other.

Figure 3:
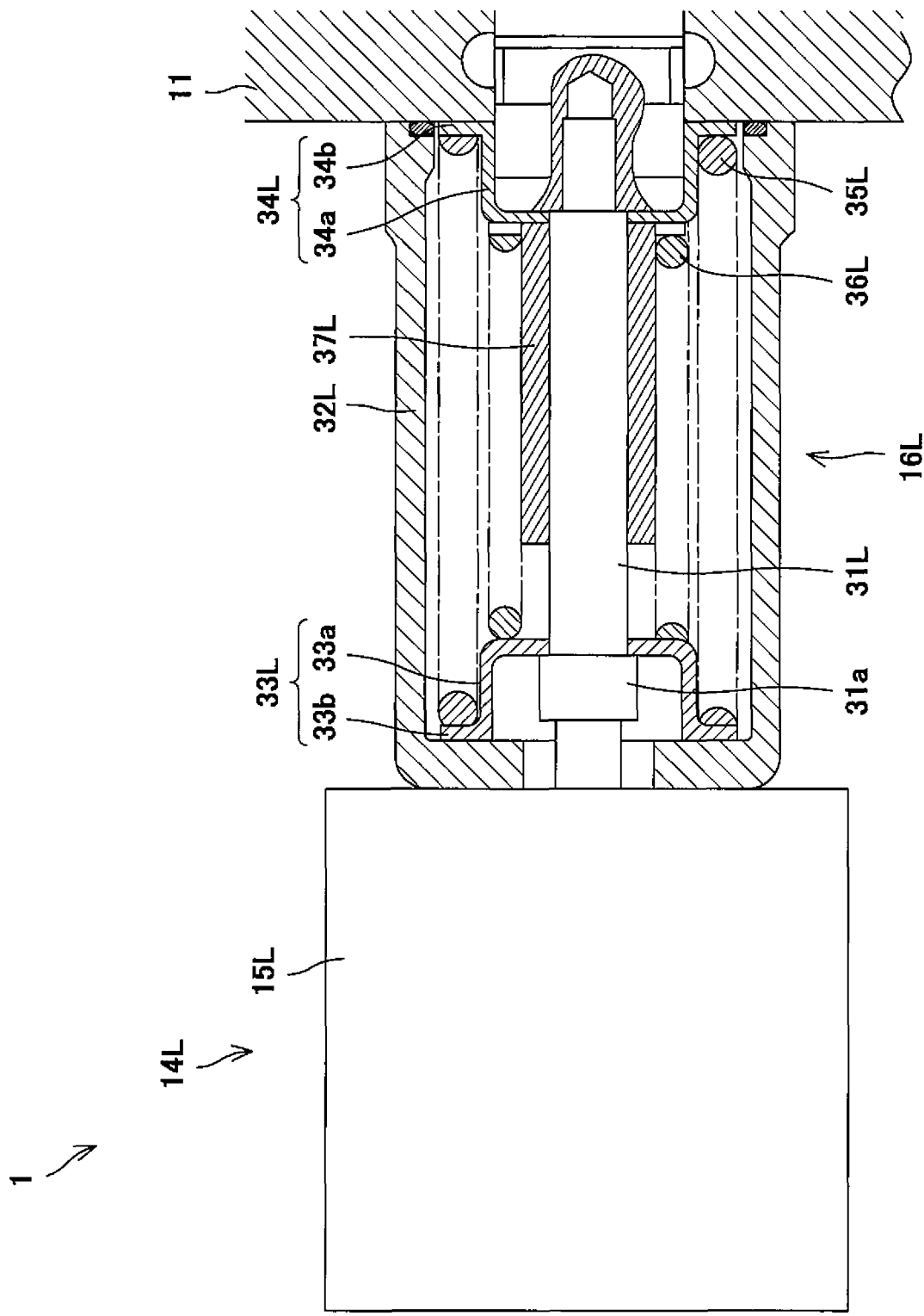
FIG. 3 is an enlarged sectional view showing a first actuator of the flow control valve apparatus of FIG. 1.

The first and second actuators 14L and 14R also shown in FIG. 3 are, for example, linear motion electric actuators. The first actuator 14L is constituted by a servo motor and a ball screw (both not shown) which are accommodated in a casing 15L, and the second actuator 14R is constituted by a servo motor and a ball screw (both not shown) which are accommodated in a casing 15R. The linear motion electric actuator includes the ball screw configured such that, for example, a slider (nut; not shown) is threadedly engaged with a screw shaft (not shown). When the screw shaft is rotated by the servo motor, the slider reciprocates in the axial direction. The sliders having such function are fixed to respective driven bodies 31L and 31R of the first and second actuators 14L and 14R.

Each of the driven bodies 31L and 31R is formed in a substantially columnar shape, and the sliders (not shown) are fixed to respective first axial end portions of the driven bodies 31L and 31R. A second axial end portion of the first driven body 31L is fixed to a first axial end portion of the first spool 12L. When the first actuator 14L is supplied with a current to rotate the servo motor, the first spool 12L can be moved to the first side or second side in the axial direction by driving force corresponding to the current. A second axial end portion of the second driven body 31R is fixed to a second axial end portion of the second spool 12R. When the second actuator 14R is supplied with a current to rotate the servo motor, the second spool 12R can be moved to the first side or second side in the axial direction by the driving force corresponding to the current. As above, the first and second spools 12L and 12R can be independently moved by using the first and second actuators 14L and 14R.

In the first and second actuators 14L and 14R configured as above, the driven body 31L is fixed to and attached to the base end portion of the spool 12L, and the driven body 31R is fixed to and attached to the base end portion of the spool 12R. The first actuator 14L is arranged so as to project to the first side of the block 11 in the axial direction, and the second actuator 14R is arranged so as to project to the second side of the block 11 in the axial direction. The first driven body 31L projects from the casing 15L of the first actuator 14L, and the second driven body 31R projects from the casing 15R of the second actuator 14R. With this, an interval is formed between the casing 15L and the block 11, and the biasing mechanism 16L is provided between the casing 15L and the block 11. Further, an interval is formed between the casing 15R and the block 11, and the biasing mechanism 16R is provided between the casing 15R and the block 11.

The first biasing mechanism 16L includes a casing member 32L, two spring receiving members 33L and 34L, coil springs 35L and 36L, and a stopper member 37L. The casing member 32L is a bottomed tubular member whose section cut along a virtual flat plane including an axis of the casing member 32L has a substantially U shape. The first driven body 31L penetrates and is covered with the casing member 32L. The casing member 32L is attached to a first axial side surface of the block 11 with an opening end thereof sealed. The casing 15L of the first actuator 14L is fixed to a bottom portion of the casing member 32L. The two spring receiving members 33L and 34L, the coil springs 35L and 36L, and the stopper member 37L are accommodated in the casing member 32L configured as above.

The spring receiving member 33L includes a main body portion 33a and a flange 33b, and the spring receiving member 34L includes a main body portion 34a and a flange 34b. Each of the main body portions 33a and 34a is formed in a bottomed tubular shape whose section cut along a virtual flat plane including an axis of each of the main body portions 33a and 34a has a substantially U-shape. The flange 33b is formed at an outer peripheral surface of an opening end of the main body portion 33a over the entire periphery in the circumferential direction so as to project outward in a radial direction, and the flange 34b is formed at an outer peripheral surface of an opening end of the main body portion 34a over the entire periphery in the circumferential direction so as to project outward in the radial direction.

A first spring receiving member 33L that is the spring receiving member 33L is arranged in the casing member 32L at the first side in the axial direction. When the first spool 12L is located at the first neutral position, the flange 33b is in contact with an inner end surface of the casing member 32L. The first driven body 31L penetrates the first spring receiving member 33L along an axis of the first spring receiving member 33L. The first driven body 31L includes a large-diameter portion 31a. The large-diameter portion 31a is arranged in the first spring receiving member 33L and is in contact with an inner end surface of the first spring receiving member 33L. Therefore, when the first driven body 31L moves to the second side in the axial direction, the first spring receiving member 33L moves to the second side in the axial direction in accordance with the movement of the large-diameter portion 31a. Further, a second spring receiving member 34L is arranged in the casing member 32L so as to be opposed to the first spring receiving member 33L.

The second spring receiving member 34L that is the spring receiving member 34L is arranged in the casing member 32L at the second side in the axial direction. When the first spool 12L is located at the first neutral position, the flange 34b is in contact with the first axial side surface of the block 11. The first axial end portion of the first spool 12L projects from the spool hole 21 of the block 11, and this projecting portion is fitted to the second spring receiving member 34L. Therefore, when the first driven body 31L is moved to the first side in the axial direction, the second spring receiving member 34L moves to the first side in the axial direction in accordance with the movement of the first spool 12L that moves together with the first driven body 31L.

The second spring receiving member 34L arranged as above is arranged so as to be opposed to and spaced apart from the first spring receiving member 33L. In order to press the receiving member 33L against the bottom portion and press the receiving member 34L against the side surface, the two coil springs 35L and 36L are interposed between the two spring receiving members 33L and 34L.

The two coil springs 35L and 36L are so-called compression coil springs. A first axial end portion of a first coil spring 35L that is the coil spring 35L is externally attached to the main body portion 33a of the first spring receiving member 33L, and a second axial end portion of the first coil spring 35L is externally attached to the main body portion 34a of the second spring receiving member 34L. Further, the end portions of the first coil spring 35L are in contact with the respective flanges 33b and 34b of the first and second spring receiving members 33L and 34L. The second coil spring 36L is arranged inside the first coil spring 35L. The second coil spring 36L is externally attached to the first driven body 31L. A first axial end portion of the second coil spring 36L is in contact with a bottom portion of the main body portion 33a of the first spring receiving member 33L, and a second axial end portion of the second coil spring 36L is in contact with a bottom portion of the main body portion 34a of the second spring receiving member 34L. The stopper member 37L is arranged inside the second coil spring 36L.

The stopper member 37L is formed in a substantially cylindrical shape and externally attached to the first driven body 31L. It should be noted that in the present embodiment, the stopper member 37L is fixed to the bottom portion of the main body portion 34a of the second spring receiving member 34L. As described above, the stopper member 37L is interposed between the two spring receiving members 33L and 34L. To be specific, when the two spring receiving members 33L and 34L move relative to each other so as to get close to each other, and a relative movement amount of the two spring receiving members 33L and 34L becomes a predetermined amount, the stopper member 37L contacts the first spring receiving member so as to prevent further a relative movement of the two spring receiving members 33L and 34L. Thus, the stopper member 37L restricts the relative movement amount to the predetermined amount or less. With this, the first spool 12L is prevented from moving to the first side and second side in the axial direction by more than the predetermined amount.

According to the first biasing mechanism 16L configured as above, when the first spool 12L is pushed or pulled in the axial direction by the first actuator 14L, the two coil springs 35L and 36L generate biasing force against driving force of the first actuator 14L. Each of the two coil springs 35L and 36L generates the biasing force corresponding to its compression amount, i.e., the position of the first spool 12L. With this, the first spool 12L moves to a position where the driving force of the first actuator 14L and the biasing force of the two coil springs 35L and 36L are balanced with each other. Thus, the first spool 12L can be moved to a position corresponding to the current supplied to the first actuator 14L. As above, the first biasing mechanism 16L can move the first spool 12L to an arbitrary position in cooperation with the first actuator 14L. As with the first spool 12L, the second spool 12R is provided with the second biasing mechanism 16R in order to move the second spool 12R to an arbitrary position.

The second biasing mechanism 16R has the same configuration as the first biasing mechanism 16L. Regarding the components of the second biasing mechanism 16R which are the same as the components of the first biasing mechanism 16L, the same reference signs including "R" instead of "L" are attached thereto, and detailed explanations thereof are omitted since the above explanations of the components of the first biasing mechanism 16L are referable. To be specific, the second biasing mechanism 16R includes a casing member 32R, two spring receiving members 33R and 34R, coil springs 35R and 36R, and a stopper member 37R. The second driven body 31R penetrates the casing member 32R, and the second biasing mechanism 16R is attached to a second axial side surface of the block 11 with an opening end thereof sealed. Further, the casing 15R of the second actuator 14R is fixed to a bottom portion of the casing member 32R of the second biasing mechanism 16R.

According to the second biasing mechanism 16R configured as above, when the second spool 12R is pushed or pulled in the axial direction by the second actuator 14R, the two coil springs 35R and 36R generate biasing force against driving force of the second actuator 14R. Each of the two coil springs 35R and 36R generates the biasing force corresponding to its compression amount, i.e., the position of the second spool 12R. With this, the second spool 12R moves to a position where the driving force of the second actuator 14R and the biasing force of the two coil springs 35R and 36R are balanced with each other. Thus, the second spool 12R can be moved to a position corresponding to the current supplied to the second actuator 14R. As above, the second biasing mechanism 16R can move the second spool 12R to an arbitrary position in cooperation with the second actuator 14R.

According to the flow control valve apparatus 1 configured as above, the two actuators 14L and 14R are connected to a controller 40, and the controller 40 controls the operations of the two actuators 14L and 14R (see FIG. 1). More specifically, the controller 40 controls the operations of the flow control valve apparatus 1 by supplying a current corresponding to a manipulation (such as a manipulation direction and a manipulation amount) of an operation tool (not shown), such as am operating lever, to the two actuators 14L and 14R. The controller 40 is constituted by a so-called computer. The controller 40 includes a CPU (Central Processing Unit), a ROM (Read Only Memory), a RAM (Random Access Memory), an I/F (Interface), an I/O (Input/output Port), and the like (all not shown). The ROM stores programs executed by the CPU, various fixed data, and the like. The programs executed by the CPU are stored in various storage mediums, such as flexible disks, CD-ROMs, and memory cards, and are installed in the ROM from the storage mediums. The RAM temporarily stores data necessary when the programs are executed. The I/F transmits data to and receives data from external devices (such as an input device and a memory device (both not shown)). The I/O performs input and output of detection signals of various sensors. The controller 40 is configured to perform processing of realizing functions by cooperation between software such as the programs stored in the ROM and hardware such as the CPU. Hereinafter, the operations of the flow control valve apparatus 1 will be explained.

Operations of Flow Control Valve Apparatus

When an operator manipulates the operation tool toward a first side in the manipulation direction in order to expand the hydraulic cylinder 2, the controller 40 detects the direction of the manipulation and the manipulation amount (such as oil pressure or a sensor value) and supplies different currents corresponding to the direction of the manipulation and the manipulation amount to the two actuators 14L and 14R. With this, the flow control valve apparatus 1 operates as below.

Figure 4:
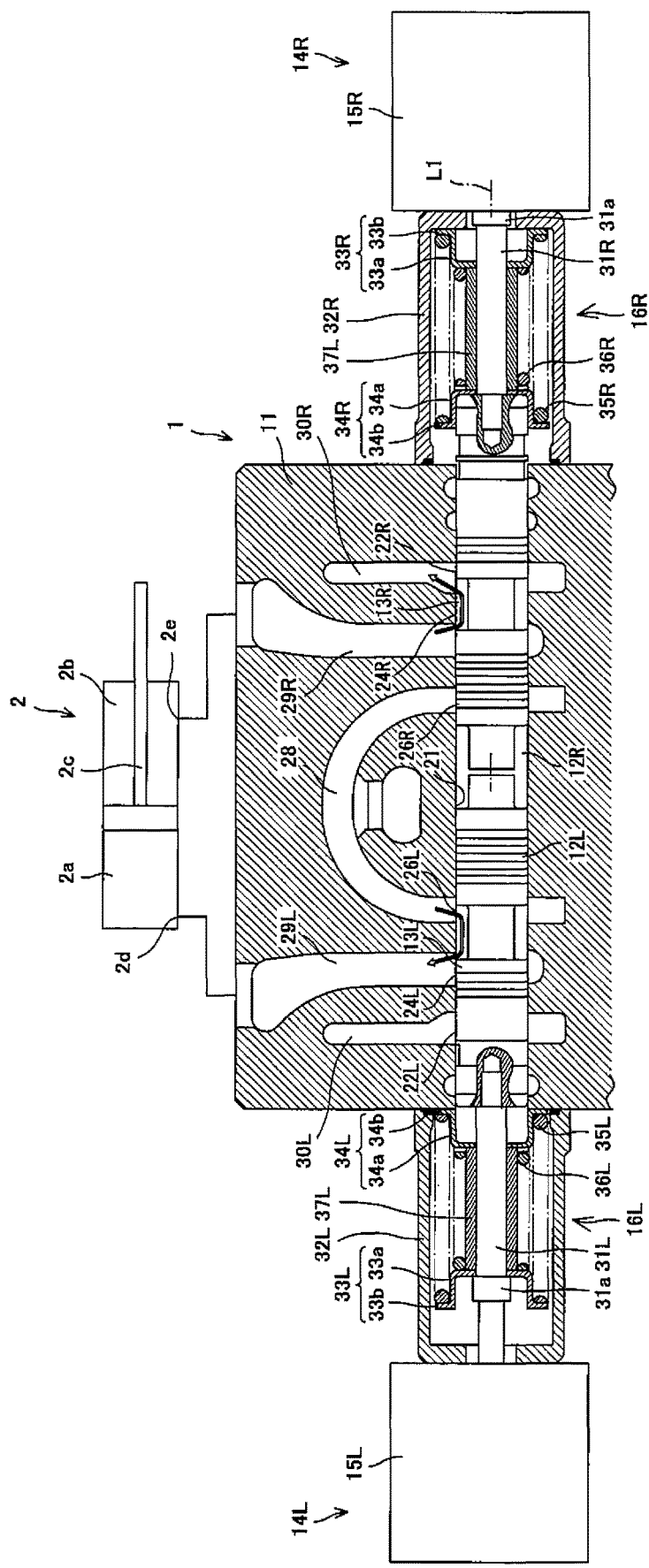
FIG. 4 is a sectional view showing a state where in the flow control valve apparatus of FIG. 1, the first spool is moved to a first supply position, and the second spool is moved to a second discharge position.

To be specific, when the first actuator 14L is supplied with the current, the first driven body 31L moves to the second side in the axial direction. With this, the first spool 12L at the first neutral position moves to the second side in the axial direction as shown in FIG. 4 and reaches the first supply position soon. Thus, a part of the round 13L which is located at the second side in the axial direction opens at the first pump port 26L, and with this, the first pump port 26L and the first supply/discharge port 24L are connected to each other through the round 13L. It should be noted that the first tank port 22L is blocked without being connected to any of the ports 24L and 26L.

When moving the first spool 12L to the second side in the axial direction, the first driven body 31L pushes the first spring receiving member 33L toward the second side in the axial direction, and therefore, receives the biasing force from the two compressed coil springs 35L and 36L. On this account, the first spool 12L reaches a position where the driving force of the first actuator 14L and the biasing force of the two coil springs 35L and 36L are balanced with each other, and stops at this position. With this, the opening degree between the first pump port 26L and the first supply/discharge port 24L is adjusted to the opening degree corresponding to the current flowing through the first actuator 14L (i.e., the opening degree corresponding to the manipulation amount of the operation tool).

Similarly, when the second actuator 14R is supplied with the current, the second driven body 31R moves to the second side in the axial direction. With this, the second spool 12R at the second neutral position moves to the second side in the axial direction and reaches the second discharge position soon. Thus, a part of the round 13R which is located at the second side in the axial direction opens at the second tank port 22R, and with this, the second tank port 22R and the second supply/discharge port 24R are connected to each other through the round 13R. It should be noted that the second pump port 26R is blocked without being connected to any of the ports 22R and 24R.

When moving the second spool 12R to the second side in the axial direction, the second driven body 31R pulls the second spring receiving member 34R toward the second side in the axial direction through the second spool 12R, and therefore, receives the biasing force from the two compressed coil springs 35R and 36R. On this account, the second spool 12R reaches a position where the driving force of the second actuator 14R and the biasing force of the two coil springs 35R and 36R are balanced with each other, and stops at this position. With this, the opening degree between the second tank port 22R and the second supply/discharge port 24R is adjusted to the opening degree corresponding to the current flowing through the second actuator 14R (i.e., the opening degree corresponding to the manipulation amount of the operation tool).

As above, when the operation tool is manipulated toward the first side in the manipulation direction, the first spool 12L moves to the first supply position, and the second spool 12R moves to the second discharge position. With this, the head-side port 2d of the hydraulic cylinder 2 is connected to the pump 3, and the rod-side port 2e of the hydraulic cylinder 2 is connected to the tank 4. Then, the operating oil is supplied from the pump 3 to the head-side oil chamber 2a, and the operating oil in the rod-side oil chamber 2b is discharged to the tank 4. As a result, the hydraulic cylinder 2 can be expanded. Further, each of the opening degree between the first pump port 26L and the first supply/discharge port 24L and the opening degree between the second tank port 22R and the second supply/discharge port 24R is adjusted to the opening degree corresponding to the manipulation amount of the operation tool, and meter-in control and meter-out control are executed with respect to the flow rates of the operating oil supplied to and discharged from the hydraulic cylinder 2. With this, a speed at which the hydraulic cylinder 2 is expanded, i.e., an operating speed of the hydraulic cylinder 2 can become a speed corresponding to the manipulation amount of the operation tool.

After that, when the operation tool is returned to a neutral position, the controller 40 stops the currents supplied to the two actuators 14L and 14R. With this, the first spring receiving member 33L is pushed by the two coil springs 35L and 36L back to such a position as to contact the bottom portion of the casing member 32L. In accordance with this, the first driven body 31L is returned to the first side in the axial direction. Thus, the first spool 12L returns to the first neutral position (see FIG. 1). Similarly, the second spring receiving member 34R is pushed by the two coil springs 35R and 36R back to such a position as to contact the side surface of the block 11. In accordance with this, the second spool 12R is pushed to the first side in the axial direction, and the second driven body 31R is returned. Thus, the second spool 12R is returned to the second neutral position (see FIG. 1).

When the two spools 12L and 12R are returned to the respective neutral positions, all of the six ports 22L, 22R, 24L, 24R, 26L, and 26R are blocked, and the supply and discharge of the operating oil to and from the head-side oil chamber 2a and the rod-side oil chamber 2b stop. With this, the expansion of the hydraulic cylinder 2 stops, and this state of the hydraulic cylinder 2 is maintained.

On the other hand, when the operator manipulates the operation tool toward a second side in the manipulation direction in order to contract the hydraulic cylinder 2, the controller 40 detects the direction of the manipulation and the manipulation amount and supplies to the two actuators 14L and 14R the currents opposite to the currents supplied when the operation tool is manipulated toward the first side in the manipulation direction. With this, the flow control valve apparatus 1 operates as below.

Figure 5:
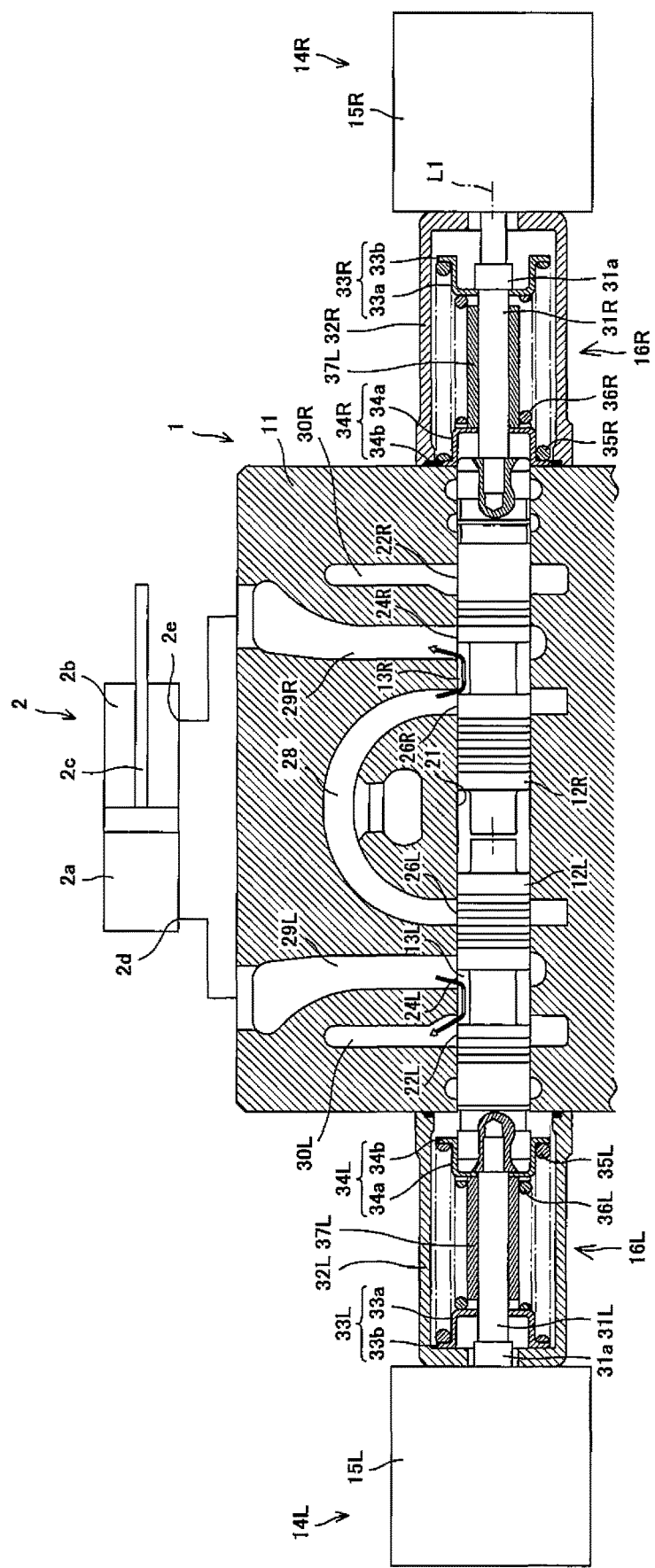
FIG. 5 is a sectional view showing a state where in the flow control valve apparatus of FIG. 1, the first spool is moved to a first discharge position, and the second spool is moved to a second supply position.

To be specific, when the first actuator 14L is supplied with the current, the first driven body 31L moves to the first side in the axial direction. With this, the first spool 12L at the first neutral position moves to the first side in the axial direction as shown in FIG. 5 and reaches the first discharge position soon. Thus, a part of the round 13L which is located at the first side in the axial direction opens at the first tank port 22L, and with this, the first tank port 22L and the first supply/discharge port 24L are connected to each other through the round 13L. It should be noted that the first pump port 26L is blocked without being connected to any of the ports 22L and 24L.

When moving the first spool 12L to the first side in the axial direction, the first driven body 31L pulls the second spring receiving member 34L toward the first side in the axial direction through the first spool 12L, and therefore, receives the biasing force from the two compressed coil springs 35L and 36L. On this account, the first spool 12L reaches a position where the driving force of the first actuator 14L and the biasing force of the two coil springs 35L and 36L are balanced with each other, and stops at this position. With this, the opening degree between the first pump port 26L and the first supply/discharge port 24L is adjusted to the opening degree corresponding to the current flowing through the first actuator 14L (i.e., the opening degree corresponding to the manipulation amount of the operation tool).

Similarly, when the second actuator 14R is supplied with the current, the second driven body 31R moves to the first side in the axial direction. With this, the second spool 12R at the second neutral position moves to the first side in the axial direction and reaches the second supply position soon. Thus, a part of the round 13R which is located at the first side in the axial direction opens at the second pump port 26R, and with this, the second pump port 26R and the second supply/discharge port 24R are connected to each other through the round 13R. It should be noted that the second tank port 22R is blocked without being connected to any of the ports 24R and 26R.

When moving the second spool 12R to the first side in the axial direction, the second driven body 31R pushes the first spring receiving member 33R toward the first side in the axial direction, and therefore, receives the biasing force from the two compressed coil springs 35R and 36R. On this account, the second spool 12R reaches a position where the driving force of the second actuator 14R and the biasing force of the two coil springs 35R and 36R are balanced with each other, and stop at this position. With this, the opening degree between the second pump port 26R and the second supply/discharge port 24R is adjusted to the opening degree corresponding to the current flowing through the second actuator 14R (i.e., the opening degree corresponding to the manipulation amount of the operation tool).

As above, when the operation tool is manipulated toward the second side in the manipulation direction, the first spool 12L moves to the first discharge position, and the second spool 12R moves to the second supply position. With this, the head-side port 2d of the hydraulic cylinder 2 is connected to the tank 4, and the rod-side port 2e of the hydraulic cylinder 2 is connected to the pump 3. Then, the operating oil is supplied from the pump 3 to the rod-side oil chamber 2b, and the operating oil in the head-side oil chamber 2a is discharged to the tank 4. As a result, the hydraulic cylinder 2 can be contracted. Further, each of the opening degree between the first tank port 22L and the first supply/discharge port 24L and the opening degree between the second pump port 26R and the second supply/discharge port 24R is adjusted to the opening degree corresponding to the manipulation amount of the operation tool, and meter-in control and meter-out control are executed with respect to the flow rates of the operating oil supplied to and discharged from the hydraulic cylinder 2. With this, a speed at which the hydraulic cylinder 2 is contracted, i.e., the operating speed of the hydraulic cylinder 2 can become a speed corresponding to the manipulation amount of the operation tool.

After that, when the operation tool is returned to the neutral position, the controller 40 stops the currents supplied to the two actuators 14L and 14R as with the above case. With this, the second spring receiving member 34L is pushed by the two coil springs 35L and 36L back to such a position as to contact the side surface of the block 11. In accordance with this, the first spool 12L is pushed back, and the first driven body 31L is returned. Thus, the first spool 12L is returned to the first neutral position (see FIG. 1). Similarly, the first spring receiving member 33R is pushed by the two coil springs 35R and 36R back to such a position as to contact the bottom portion of the casing member 32R. In accordance with this, the second driven body 31R is returned to the second side in the axial direction. Thus, the second spool 12R is returned to the second neutral position (see FIG. 1). Therefore, all of the six ports 22L, 22R, 24L, 24R, 26L, and 26R are blocked. With this, the contraction of the hydraulic cylinder 2 stops, and this state of the hydraulic cylinder 2 is maintained.

The flow control valve apparatus 1 configured as above further has the following functions. According to a hydraulic excavator, the direction and magnitude of own weight of the constituting member, such as the boom, which weight acts on the constituting member vary depending on the posture of the constituting member, and the operating speed of the constituting member changes depending on the direction and magnitude of the own weight of the constituting member. It is preferable that a change in the operating speed of the hydraulic cylinder 2 with respect to the manipulation amount of the operation tool by the influences of the direction and magnitude of the own weight of the constituting member be suppressed.

According to the flow control valve apparatus 1, the two spools 12L and 12R formed separately are inserted into the spool hole 21. Further, the separate actuators 14L and 14R are provided for the respective two spools 12L and 12R, and the two spools 12L and 12R can move independently. Therefore, the two spools 12L and 12R which have moved together in order to expand or contract the hydraulic cylinder 2 can be moved individually therefrom, and the flow rates of the operating oil supplied to and discharged from the hydraulic cylinder 2 can be controlled independently.

Figure 6:
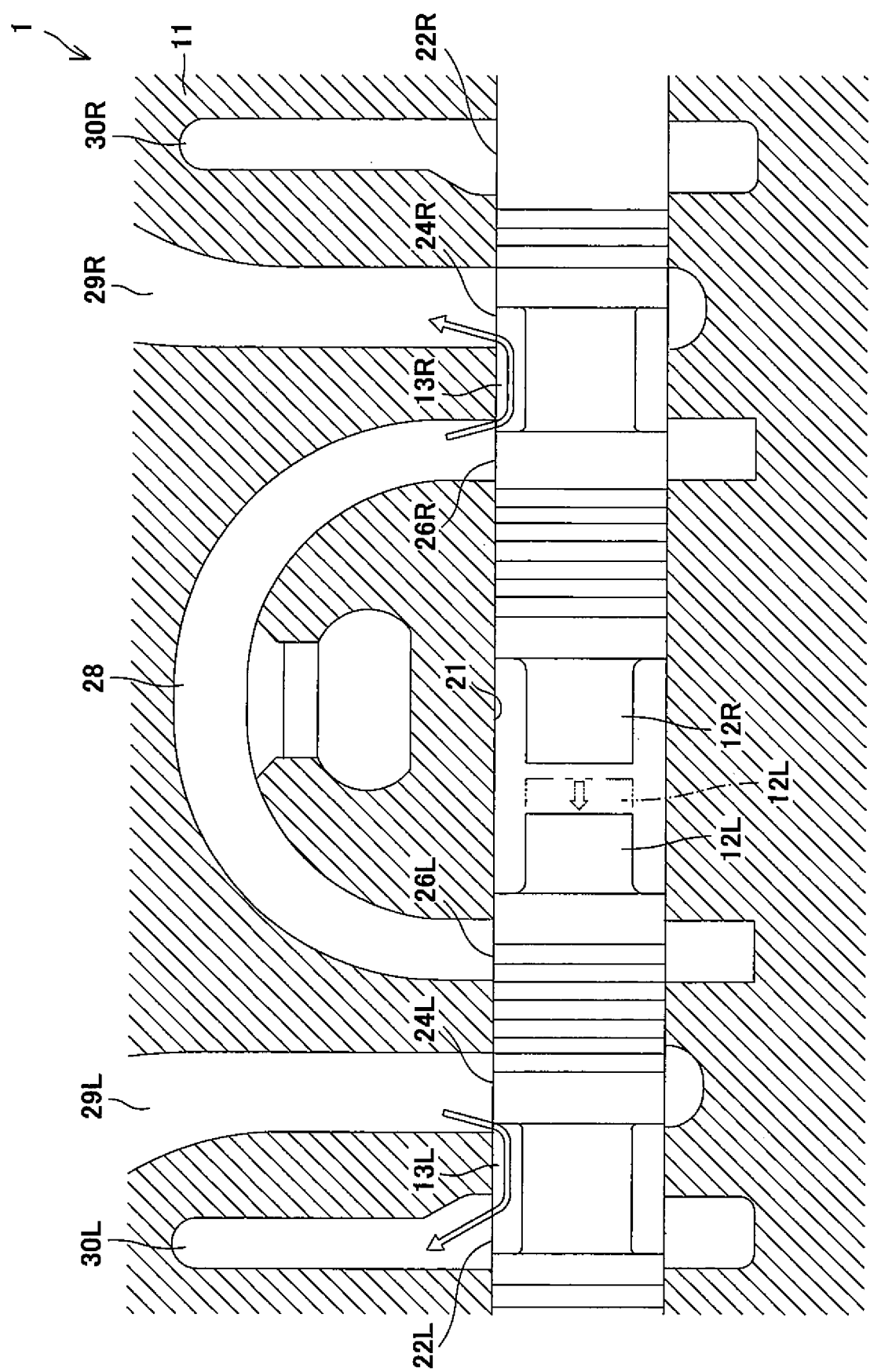
FIG. 6 is a sectional view showing a state where in the flow control valve apparatus of FIG. 1, the first spool is independently moved to a first side in an axial direction.

For example, when contracting the hydraulic cylinder 2 in order to move the constituting member in a direction in which the own weight of the constituting member acts, as shown in FIG. 6, only the first spool 12L at the first discharge position is moved without moving the second spool 12R. In this case, the opening degree between the first tank port 22L and the first supply/discharge port 24L is reduced by moving the first spool 12L to the first side in the axial direction by the first actuator 14L. With this, the amount of operating oil discharged from the head-side oil chamber 2a is limited, and this limits the operating speed of the hydraulic cylinder 2.

Figure 7:
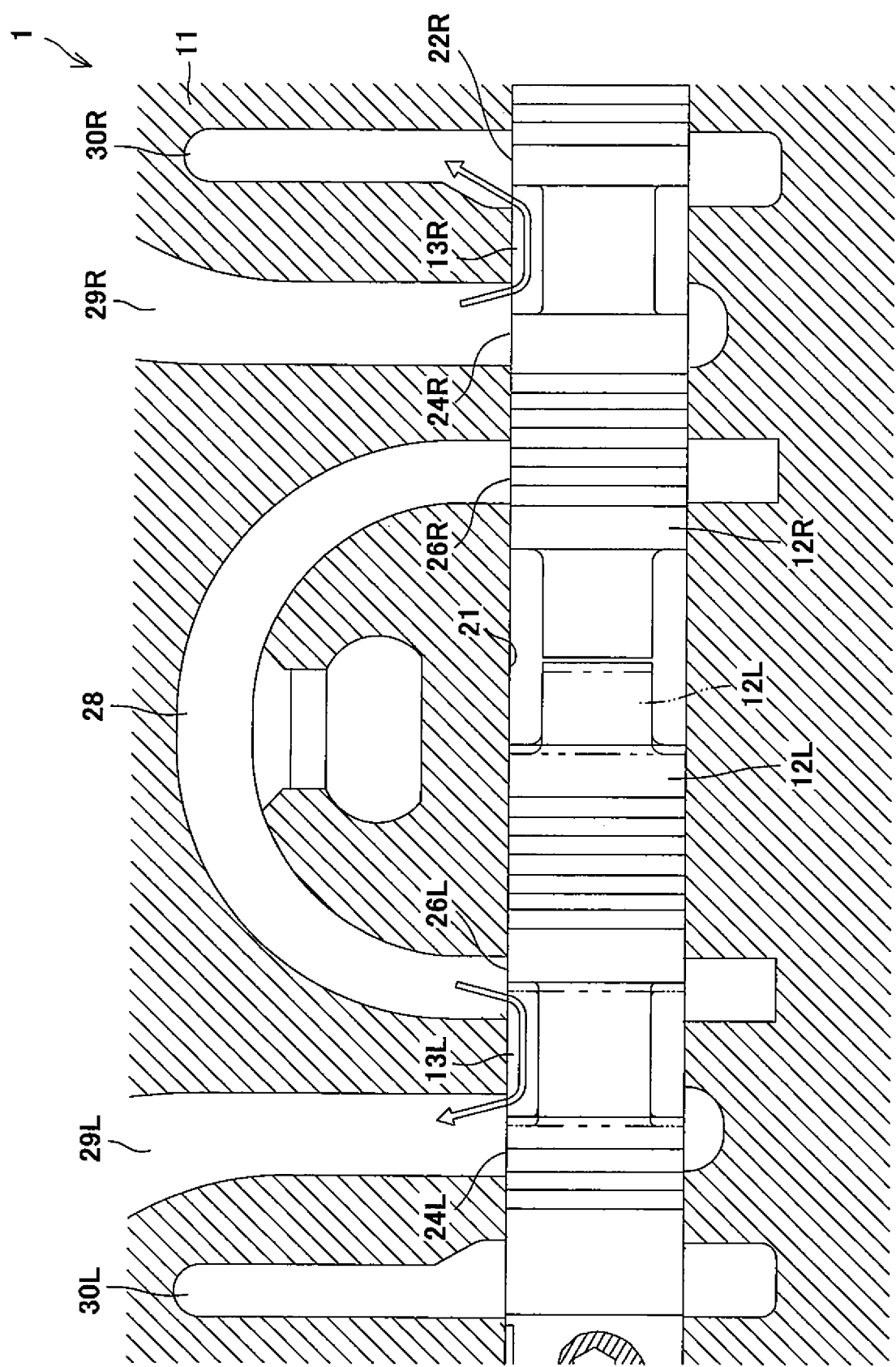
FIG. 7 is a sectional view showing a state where in the flow control valve apparatus of FIG. 1, the first spool is independently moved to a second side in the axial direction.

Further, according to the flow control valve apparatus 1, as described above, the interval X is formed between the two spools 12L and 12R. Even when the two spools 12L and 12R are moved so as to get close to each other, the two spools 12L and 12R do not contact each other as long as the movement distance is less than the interval X, and the two spools 12L and 12R can move independently. Therefore, as shown in FIG. 7, without moving the second spool 12R, the first spool 12L at the first supply position can be moved so as to get close to the second spool 12R (i.e., can be moved to the second side in the axial direction). With this, the opening degree between the first pump port 26L and the first supply/discharge port 24L can be increased. Thus, the amount of operating oil supplied to the head-side oil chamber 2a can be increased, and this can increase the hydraulic pressure in the head-side oil chamber 2a. Therefore, the hydraulic cylinder 2 can be expanded against the own weight of the constituting member, and the decrease in the operating speed of the hydraulic cylinder 2 can be suppressed. It should be noted that the opening degree between the second tank port 22R and the second supply/discharge port 24R may be increased by moving the first spool 12L to the second side in the axial direction and also moving the second spool 12R to the second side in the axial direction. With this, resistance when discharging the operating oil can be suppressed.

As above, according to the flow control valve apparatus 1, as with a case where a meter-in flow control valve and a meter-out flow control valve are separately provided for the hydraulic cylinder 2, the flow rates of the operating oil supplied to and discharged from the hydraulic cylinder 2 can be controlled independently. Therefore, the influence of the own weight of the constituting member on the operating speed of the hydraulic cylinder 2 with respect to the manipulation amount of the operation tool can be suppressed in such a manner that the controller 40 detects the direction and magnitude of the own weight of the constituting member in advance, controls the current supplied to the first actuator 14L, and limits a reduction amount of the opening degree.

Further, according to the flow control valve apparatus 1, unlike a case where the meter-in flow control valve and the meter-out flow control valve are separately provided for the hydraulic cylinder 2, the two spools 12L and 12R are inserted into the single spool hole 21. Therefore, the number of spool holes 21 of the block 11 used in the flow control valve apparatus 1 can be suppressed to a minimum, and the increase in size of the block 11 can be suppressed.

Figure 8:
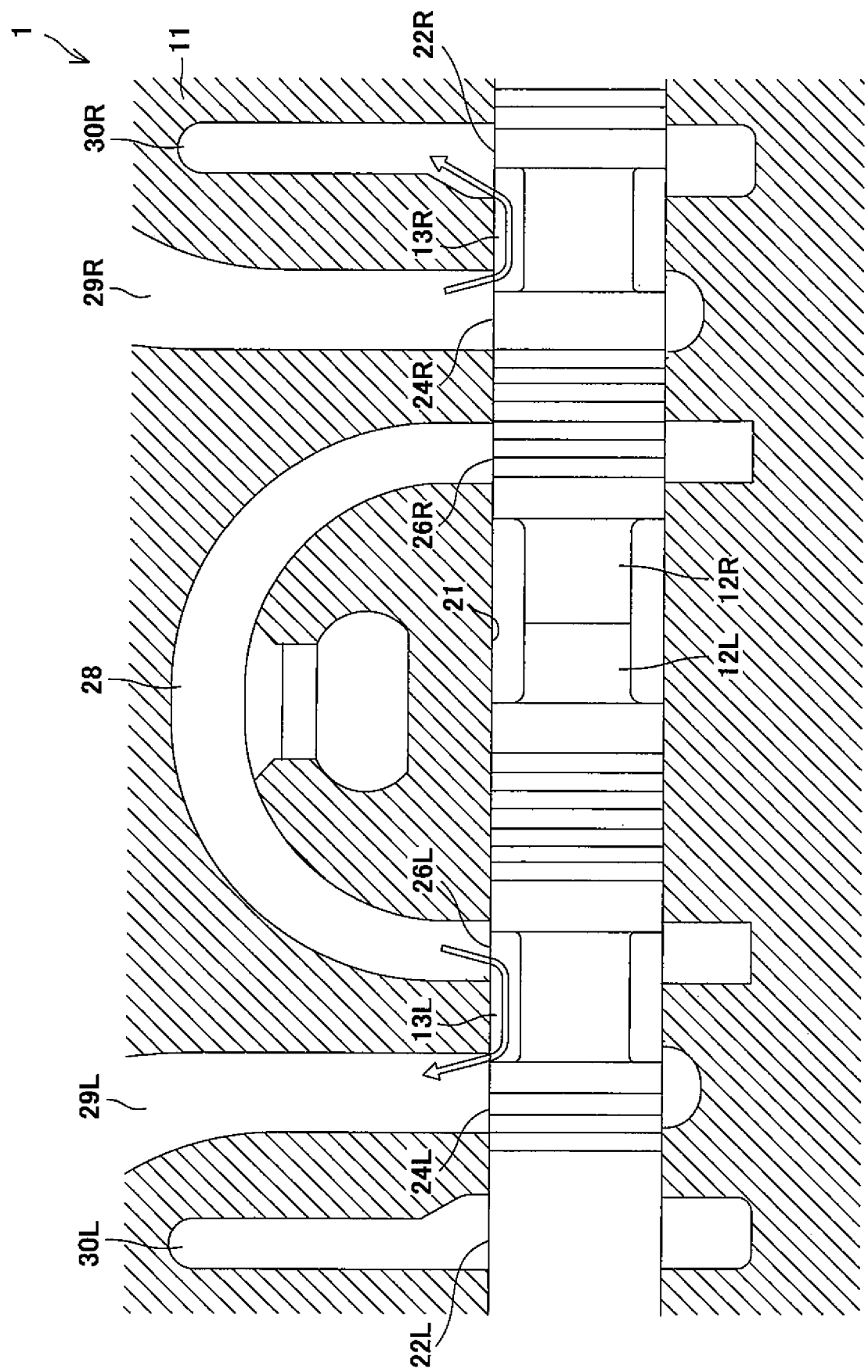
FIG. 8 is a sectional view showing a state where in the flow control valve apparatus of FIG. 1, the first spool pushes and moves the second spool.

Further, according to the flow control valve apparatus 1, since the two spools 12L and 12R are arranged close to each other, the two spools 12L and 12R operate as below. To be specific, even when one of the two actuators 14L and 14R cannot be supplied with the current due to disconnection or the like, and therefore, cannot be driven, the other of the two actuators 14L and 14R can be used. For example, if disconnection occurs between the second actuator 14R and the controller 40, and therefore, the second actuator 14R malfunctions, the second spool 12R do not move from the second neutral position. On the other hand, by supplying the current from the controller 40 to the first actuator 14L, the first spool 12L moves to the second side in the axial direction to get close to and contact the second spool 12R (see FIG. 8). By further supplying the current to the first actuator 14L, the first spool 12L pushes the second spool 12R to the second side in the axial direction, and therefore, the first and second spools 12L and 12R integrally move to the second side in the axial direction in the spool hole 21. With this, the first spool 12L can be moved to a second offset position, and the second spool 12R which do not move from the second neutral position can be moved to a first offset position.

As above, even when the operating oil is supplied to the head-side oil chamber 2a by moving the first spool 12L to the second offset position in a state where the second actuator 14R malfunctions, the operating oil can be discharged from the rod-side oil chamber 2b. Therefore, the hydraulic pressure in the head-side oil chamber 2a can be prevented from becoming high. The same is true for a case where the first actuator 14L malfunctions. To be specific, even when the operating oil is supplied to the rod-side oil chamber 2b by moving the second spool 12R to the second offset position, the operating oil can be discharged from the head-side oil chamber 2a. With this, the hydraulic pressure in the rod-side oil chamber 2a can be prevented from becoming high. Thus, fail safe can be achieved.

The foregoing has explained a case where both of the spools 12L and 12R move. The following will explain a case where one of the two spools 12L and 12R cannot move at all due to its malfunction or due to the malfunction of the actuator 14L or 14R (for example, a case where sticking of one of the spools 12L and 12R or one of the actuators 14L and 14R occurs because of some reasons (such as entering of foreign matters). For example, if the second spool 12R cannot move from the second neutral position, and the first actuator 14L moves the first spool 12L to the second side in the axial direction, i.e., in a direction toward the second spool 12R, the first spool 12L contacts the second spool 12R soon. With this, the movement distance of the first spool 12L is restricted to the interval X. To be specific, the second spool 12R serves as a stopper. The interval X is predetermined based on: relations (such as lengths and arrangement positions) among the ports 22L to 26R and the rounds 13L and 13R; and the lengths of the spools 12L and 12R. With this, the opening degree between the first pump port 26L and the first supply/discharge port 24L can be prevented from excessively increasing. Therefore, the hydraulic pressure in the head-side oil chamber 2a can be prevented from excessively increasing. Thus, fail safe can be achieved.

Further, for example, if the second spool 12R cannot move from the second neutral position, and the first actuator 14L moves the first spool 12L to the second side in the axial direction, i.e., in a direction toward the second spool 12R, the first spool 12L contacts the second spool 12R soon. By further moving the first spool 12L to the second side in the axial direction, the second spool 12R is forcibly pushed, and this can eliminate the sticking of the second spool 12R. Even when the sticking of the first spool 12L occurs, it can be eliminated in the same way.

It should be noted that in the flow control valve apparatus 1, the tank ports 22L and 22R are formed at an outer side of the block 11. Therefore, when the actuator 14L or 14R malfunctions or the spool 12L or 12R becomes inoperative, and one of the spools 12L and 12R is moved in a direction away from the other of the spools 12L and 12R, the supply/discharge port 24L or 24R is connected to the tank port 22L or 22R. Therefore, fail safe can be achieved.

According to the flow control valve apparatus 1 configured as above, when the two spools 12L and 12R are moved to the first side in the axial direction, the two spools 12L and 12R move to the first discharge position and the second supply position, respectively. Further, when the two spools 12L and 12R are moved to the second side in the axial direction, the two spools 12L and 12R move to the first supply position and the second discharge position, respectively. Therefore, even though the two spools 12L and 12R are inserted into and arranged in the single spool hole 21, the two spools 12L and 12R can be moved without interfering with each other. Thus, the two spools 12L and 12R can be arranged close to each other. On this account, as compared to a case where the two spools 12L and 12R move in different directions, the length of the spool hole 21 can be made short, and the increase in size of the block 11 can be suppressed.

Further, according to the flow control valve apparatus 1, in order to move the spools 12L and 12R, the first and second actuators capable of pushing and pulling the spools 12L and 12R are adopted. With this, only by arranging the actuator at the first side of the spool 12L in the axial direction and arranging the actuator at the second side of the spool 12R in the axial direction, the two spools 12L and 12R can reciprocate in the axial direction. Therefore, as compared to a case where driving portions are arranged at both axial sides of each of the two spools 12L and 12R, the flow control valve apparatus 1 can be reduced in size.

Further, since the linear motion electric actuators each constituted by the servo motor and the ball screw are used in the flow control valve apparatus 1, the positions of the two spools 12L and 12R can be adjusted with a high degree of accuracy. Thus, the operating oil can be accurately supplied or discharged at the flow rate corresponding to the current.

Further, according to the flow control valve apparatus 1, the spool 12L is biased by the biasing mechanism 16L toward the neutral position, and the spool 12R is biased by the biasing mechanism 16R toward the neutral position. Therefore, even if the two actuators 14L and 14R malfunction, the pressure oil can be prevented from being continuously supplied to the hydraulic cylinder 2. Thus, fail safe can be achieved.

OTHER EMBODIMENTS

The foregoing has explained a case where the flow control valve apparatus 1 of the present embodiment is applied to a hydraulic excavator. However, the industrial machinery to which the flow control valve apparatus 1 of the present embodiment is applied is not limited to the hydraulic excavator and may be an industrial machinery, such as a wheel loader or a crane, including a hydraulic cylinder. Further, equipment to which the flow control valve apparatus 1 is applied is not limited to the hydraulic cylinder and may be liquid-pressure equipment, such as a hydraulic motor.

Further, according to the flow control valve apparatus 1, the tank port 22L (22R), the supply/discharge port 24L (24R), and the pump port 26L (26R) are formed at the block 11 in this order from an outer side toward an inner side. However, the arrangement positions of these ports are not limited. For example, the tank port 22L (22R), the supply/discharge port 24L (24R), and the pump port 26L (26R) may be formed in this order from the inner side to the outer side. In this case, two rounds are formed at the spool 12L (12R), and at the neutral position, the two rounds are arranged so as to face the tank port 22L (22R) and the pump port 26L (26R), respectively. Further, only the positions of the second tank port 22R and the second pump port 26R may be replaced with each other.

Further, according to the flow control valve apparatus 1 of the present embodiment, the linear motion electric actuators each including the ball screw are adopted as the first and second actuators 14L and 14R. However, the first and second actuators 14L and 14R do not necessarily have to be configured as above. The first and second actuators 14L and 14R are only required to linearly move the respective spools 12L and 12R. Each of the spools 12L and 12R may be linearly moved by using a linear motor, a voice coil motor, a cam mechanism, a rack and pinion mechanism, or the like.

Further, according to the flow control valve apparatus 1 of the present embodiment, the two spools 12L and 12R are arranged close to each other. However, the two spools 12L and 12R do not necessarily have to be arranged close to each other and may be arranged away from each other.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1 flow control valve apparatus
11 block
12L spool
12R spool
14L first actuator
14R second actuator
16L first biasing mechanism
16R second biasing mechanism
21 spool hole
22L first tank port
22R second tank port
24L first supply/discharge port
24R second supply/discharge port
26L first pump port
26R second pump port

The invention claimed is:

1. A flow control valve apparatus comprising:
a housing including a first pump port, a second pump port, a first tank port, a second tank port, a first supply/discharge port, a second supply/discharge port, and a spool hole at which all of these ports are open;
a first spool configured to switch a connection status among the first pump port, the first tank port, and the first supply/discharge port depending on a position of the first spool;
a first actuator configured to move the first spool to each of a first supply position where the first pump port and the first supply/discharge port are connected to each other and a first discharge position where the first tank port and the first supply/discharge port are connected to each other;
a second spool configured to switch a connection status among the second pump port, the second tank port, and the second supply/discharge port depending on a position of the second spool; and
a second actuator configured to move the second spool to each of a second supply position where the second pump port and the second supply/discharge port are connected to each other and a second discharge position where the second tank port and the second supply/discharge port are connected to each other, wherein:
when the first spool is located at a first neutral position, the first spool blocks the first pump port, the first tank port, and the first supply/discharge port;
when the second spool is located at a second neutral position, the second spool blocks the second pump port, the second tank port, and the second supply/discharge port;
the first spool and the second spool are arranged with a gap between their tip ends when the first spool is located at the first neutral position and the second spool is located at a second neutral position, and the first spool and the second spool are inserted in the spool hole so as to reciprocate;
the first actuator pushes and pulls the first spool to make the first spool reciprocate away from the first neutral position; and
the second actuator pushes and pulls the second spool to make the second spool reciprocate away from the second neutral position.

2. The flow control valve apparatus according to claim 1, wherein the two pump ports, the two tank ports, the first supply/discharge port, and the second supply/discharge port are arranged such that: when the first spool and the second spool move to a first side in a predetermined direction, the first spool is located at the first supply position, and the second spool is located at the second discharge position; and when the first spool and the second spool move to a second side in the predetermined direction, the first spool is located at the first discharge position, and the second spool is located at the second supply position.

3. The flow control valve apparatus according to claim 2, wherein the first and second spools are arranged close to each other in the spool hole.

4. The flow control valve apparatus according to claim 2, wherein:
the first actuator is arranged at the first side of the housing in the predetermined direction; and
the second actuator is arranged at the second side of the housing in the predetermined direction.

5. The flow control valve apparatus according to claim 4, further comprising:
a first biasing mechanism configured to bias the first spool against pushing and pulling by the first actuator; and
a second biasing mechanism configured to bias the second spool against pushing and pulling by the second actuator, wherein:
the first biasing mechanism biases the first spool toward the first neutral position; and
the second biasing mechanism biases the second spool toward the second neutral position.

6. The flow control valve apparatus according to claim 1, wherein the first actuator and the second actuator are linear motion electric actuators.

7. The flow control valve apparatus according to claim 1, wherein the first spool and the second spool are configured to move each other independently.

8. The flow control valve apparatus according to claim 3, wherein:
the first actuator is arranged at the first side of the housing in the predetermined direction; and
the second actuator is arranged at the second side of the housing in the predetermined direction.

9. The flow control valve apparatus according to claim 5, wherein the first biasing mechanism is disposed between the first spool and the first actuator, and the second biasing mechanism is disposed between the second spool and the second actuator.

10. The flow control valve apparatus according to claim 5, wherein the first biasing mechanism includes a first coil spring and a second coil spring for biasing the first spool, a first spring receiving member on which one end of the first coil spring and one end of the second coil spring are provided and a second spring receiving member on which the other end of the first coil spring and the other end of the second coil spring are provided, a first stopper member disposed between the first spring receiving member and the second spring receiving member, and a first casing member that houses the first coil spring, the second coil spring, the first spring receiving member, the second spring receiving member, and the first stopper member; and
the second biasing mechanism includes a third coil spring and a fourth coil spring for biasing the second spool, a third spring receiving member on which one end of the third coil spring and one end of the fourth coil spring are provided and a fourth spring receiving member on which the other end of the third coil spring and the other end of the fourth coil spring are provided, a second stopper member disposed between the third spring receiving member and the fourth spring receiving member, and a second casing member that houses the third coil spring, the fourth coil spring, the third spring receiving member, the fourth spring receiving member, and the second stopper member.

* * * * *